United States Patent
Ito et al.

(10) Patent No.: US 10,703,952 B2
(45) Date of Patent: Jul. 7, 2020

(54) THERMALLY CONDUCTIVE SHEET

(71) Applicant: ZEON CORPORATION, Chiyoda-ku, Tokyo (JP)

(72) Inventors: Toyokazu Ito, Tokyo (JP); Masaya Miyamura, Tokyo (JP); Gen Kobayashi, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 105 days.

(21) Appl. No.: 15/888,249

(22) Filed: Feb. 5, 2018

(65) Prior Publication Data

US 2018/0223147 A1 Aug. 9, 2018

(30) Foreign Application Priority Data

Feb. 7, 2017 (JP) ................... 2017-020702

(51) Int. Cl.
| | | |
|---|---|---|
| *C08L 27/12* | (2006.01) | |
| *C08L 27/14* | (2006.01) | |
| *C08L 27/16* | (2006.01) | |
| *C08L 27/18* | (2006.01) | |
| *C08L 27/20* | (2006.01) | |
| *C09K 5/14* | (2006.01) | |

(52) U.S. Cl.
CPC .............. *C09K 5/14* (2013.01); *C08L 27/12* (2013.01); *C08L 27/14* (2013.01); *C08L 27/16* (2013.01); *C08L 27/18* (2013.01); *C08L 27/20* (2013.01); *C08L 2203/20* (2013.01); *C08L 2205/025* (2013.01); *C08L 2666/55* (2013.01)

(58) Field of Classification Search
None
See application file for complete search history.

(56) References Cited

U.S. PATENT DOCUMENTS

| | | | | |
|---|---|---|---|---|
| 2004/0054029 A1* | 3/2004 | Fujiki | ................ | H05K 9/0083 523/137 |
| 2008/0153986 A1* | 6/2008 | Maeda | .................... | C08L 27/12 525/101 |
| 2008/0318049 A1 | 12/2008 | Hata et al. | | |
| 2011/0300388 A1* | 12/2011 | Yokota | ................ | B29C 45/0005 428/422 |
| 2017/0066955 A1* | 3/2017 | Chen | ........................ | C09K 5/14 |

FOREIGN PATENT DOCUMENTS

| | | |
|---|---|---|
| JP | 2008255275 A | 10/2008 |
| WO | 2006011655 A1 | 2/2006 |
| WO | 2016185688 A1 | 11/2016 |

* cited by examiner

*Primary Examiner* — Richard A Huhn
(74) *Attorney, Agent, or Firm* — Kenja IP Law PC

(57) ABSTRACT

A thermally conductive sheet includes a resin that is liquid under normal temperature and pressure, a resin that is solid under normal temperature and pressure, and a particulate carbon material, and the thermal resistance of the thermally conductive sheet under a pressure of 0.05 MPa is at most 0.30° C/W. In the thermally conductive sheet, the resin that is solid under normal temperature and pressure is preferably a thermoplastic fluororesin that is solid under normal temperature and pressure, and the resin that is liquid under normal temperature and pressure is preferably a thermoplastic fluororesin that is liquid under normal temperature and pressure.

10 Claims, No Drawings

THERMALLY CONDUCTIVE SHEET

CROSS-REFERENCE TO RELATED APPLICATION

The present application claims priority to and the benefit of Japanese Patent Application No. 2017-020702 filed Feb. 7, 2017, the entire contents of which are incorporated herein by reference.

TECHNICAL FIELD

The present disclosure relates to a thermally conductive sheet.

BACKGROUND

The amount of heat generated by electronic parts, such as in plasma display panels (PDPs) and integrated circuit (IC) chips, has risen over recent years with an increase in performance. In electronic devices that use such electronic parts, functional impairment due to the higher temperature of such electronic parts needs to be prevented.

One typical way to prevent functional impairment due to the higher temperature of electronic parts is to promote heat dissipation by attaching a heat dissipator, such as a metal heat sink, a radiator plate, or a heat dissipating fin, to the heating element, such as the electronic parts. When using a heating element, the heating element and the heat dissipator are usually placed in close contact with a heat dissipating member therebetween to transfer heat efficiently from the heating element to the heat dissipator. The heat dissipating member is a member in the form of grease with high thermal conductivity (thermally conductive grease), a member in the form of a sheet (thermally conductive sheet), or the like.

The heat dissipating member used by being clamped between the heating element and the heat dissipator is thus desired to have excellent thermal conductivity while under the pressure from being clamped. In recent years, the pressure on the heat dissipating member when clamped between adherends such as the heating element and the heat dissipator (clamping pressure) has sometimes been a relatively low pressure of 0.08 MPa or less. A heat dissipating member that exhibits excellent thermal conductivity even when used at a relatively low clamping pressure is thus particularly desired.

Another typical way to increase the thermal conductivity of the heat dissipating member during use by being clamped between adherends such as the heating element and the heat dissipator is to provide the heat dissipating member with high flexibility, thereby increasing the close adherence between the heat dissipating member and the adherends and reducing the thermal resistance of the heat dissipating member under pressure due to being clamped.

However, using a highly flexible heat dissipating member by clamping between adherends such as the heating element and the heat dissipator leads to the problem of the components of the heat dissipating member leaking to the outside of the adherends (pump-out) because of the clamping pressure and heat from the heating element.

To address this problem, patent literature (PTL) 1, for example, discloses that during preparation of a thermally conductive silicone grease composition as a heat dissipating member, the viscosity of the composition is adjusted using liquid dimethyl polysiloxane with a particular substituent as silicone, thereby suppressing leakage of the thermally conductive silicone grease composition during the cooling/heating cycle of electronic parts.

CITATION LIST

Patent Literature

PTL 1: JP 2008-255275 A

SUMMARY

Heat dissipating members such as the one disclosed in PTL 1, however, have room for improvement in making suppression of pump-out compatible with excellent thermal conductivity during use at a relatively low clamping pressure.

In light of these considerations, it would be helpful to provide a thermally conductive sheet as a heat dissipating member that can achieve excellent thermal conductivity while suppressing pump-out during use at a relatively low clamping pressure.

In the present disclosure, a "relatively low clamping pressure" refers to a clamping pressure of at most 0.08 MPa (absolute pressure).

Extensive studies revealed that concomitantly using a resin that is liquid under normal temperature and pressure, a resin that is solid under normal temperature and pressure, and particulate carbon material and forming a thermally conductive sheet to have a thermal resistance of a predetermined value or less can achieve excellent thermal conductivity while successfully suppressing pump-out at a relatively low clamping pressure. This discovery led to the present disclosure.

A thermally conductive sheet according to the present disclosure includes a resin that is liquid under normal temperature and pressure; a resin that is solid under normal temperature and pressure; and a particulate carbon material, and a thermal resistance of the thermally conductive sheet under a pressure of 0.05 MPa is at most 0.30° C/W. A thermally conductive sheet that thus includes at least a resin that is liquid under normal temperature and pressure, a resin that is solid under normal temperature and pressure, and a particulate carbon material and has a low thermal resistance of the aforementioned predetermined value or less can achieve excellent thermal conductivity while successfully suppressing pump-out during use at a relatively low clamping pressure. When the thermally conductive sheet according to the present disclosure is attached between a heating element and a heat dissipator, for example, and the clamping pressure is relatively low, the thermally conductive sheet can therefore efficiently dissipate heat from the heating element while successfully suppressing pump-out.

In the present disclosure, a "normal temperature" refers to 23° C., and a "normal pressure" refers to 1 atm (absolute pressure).

The "thermal resistance" can be measured using the method described in the Examples of the present disclosure.

In the thermally conductive sheet according to the present disclosure, the resin that is solid under normal temperature and pressure is preferably a thermoplastic fluororesin that is solid under normal temperature and pressure. Using a thermoplastic fluororesin that is solid under normal temperature and pressure can improve the flame retardancy, heat resistance, oil resistance, and chemical resistance of the thermally conductive sheet.

In the thermally conductive sheet according to the present disclosure, the resin that is liquid under normal temperature and pressure is preferably a thermoplastic fluororesin that is liquid under normal temperature and pressure. Using a thermoplastic fluororesin that is liquid under normal temperature and pressure can improve the flame retardancy, heat resistance, oil resistance, and chemical resistance of the thermally conductive sheet.

In the thermally conductive sheet according to the present disclosure, the percentage content of the resin that is liquid under normal temperature and pressure is preferably at least 40 mass % and no greater than 90 mass % of the total content of the resin that is liquid under normal temperature and pressure and the resin that is solid under normal temperature and pressure. Setting the percentage content of the resin that is liquid under normal temperature and pressure to be within the above range can make high thermal conductivity and suppression of pump-out more compatible when using the thermally conductive sheet at a relatively low clamping pressure.

In the present disclosure, the percentage contents of the resin that is liquid under normal temperature and pressure and the resin that is solid under normal temperature and pressure in the thermally conductive sheet can each be calculated from a calibration curve created using a differential scanning calorimeter (DSC).

In the thermally conductive sheet according to the present disclosure, the Mooney viscosity ($ML_{1+4}$, 100° C.) of the resin that is solid under normal temperature and pressure is preferably at least 3.5 and no greater than 120. Setting the Mooney viscosity of the resin that is solid under normal temperature and pressure to be within the above range can make high thermal conductivity and suppression of pump-out more compatible when using the thermally conductive sheet at a relatively low clamping pressure.

In the present disclosure, the "Mooney viscosity ($ML_{1+4}$, 100° C.)" can be measured in conformity with JIS K6300 at a temperature of 100° C. using the method described in the Examples of the present disclosure.

In the thermally conductive sheet according to the present disclosure, the percentage content of the particulate carbon material is preferably at least 25 volume % and no greater than 40 volume %. Setting the percentage content of the particulate carbon material to be within the above range can make high thermal conductivity and suppression of pump-out even more compatible when using the thermally conductive sheet at a relatively low clamping pressure.

In the present disclosure, the "percentage content (volume %)" can be calculated using the method described in the Examples of the present disclosure.

The present disclosure can provide a thermally conductive sheet as a heat dissipating member that can achieve excellent thermal conductivity while suppressing pump-out during use at a relatively low clamping pressure.

DETAILED DESCRIPTION

Embodiments of the present disclosure will now be described.

A thermally conductive sheet according to the present disclosure can, for example, be used by being clamped between a heating element and a heat dissipator when the heat dissipator is attached to the heating element. In other words, the thermally conductive sheet according to the present disclosure can act as a heat dissipating member to constitute a heat dissipating device together with a heat dissipator, such as a heat sink, a radiator plate, or a heat dissipating fin.

The thermally conductive sheet according to the present disclosure can be manufactured with any appropriate method as long as the thermally conductive sheet includes predetermined components and has a predetermined heat resistance as described below.

(Thermally Conductive Sheet)

The thermally conductive sheet according to the present disclosure includes a resin that is liquid under normal temperature and pressure, a resin that is solid under normal temperature and pressure, and a particulate carbon material, and may optionally further include fibrous carbon material and additives. The thermal resistance of the thermally conductive sheet according to the present disclosure under a pressure of 0.05 MPa is at most 0.30° C/W. The thermally conductive sheet according to the present disclosure includes at least a resin that is liquid under normal temperature and pressure, a resin that is solid under normal temperature and pressure, and a particulate carbon material and has a low thermal resistance of the aforementioned predetermined value or less under a pressure of 0.05 MPa, thereby reducing the likelihood of pump-out (excellent pump-out resistance) and yielding excellent thermal conductivity even during use at a relatively low clamping pressure. When the thermally conductive sheet according to the present disclosure is used in combination with a heat dissipator, such as a heat sink, a radiator plate, or a heat dissipating fin, heat can therefore effectively be dissipated from a heating element through the thermally conductive sheet even when the thermally conductive sheet is clamped between the heating element and the heat dissipator at a relatively low clamping pressure. Furthermore, when the thermally conductive sheet according to the present disclosure is used by being clamped between adherends such as a heating element and a heat dissipator, the adherends are not contaminated by pump-out from the thermally conductive sheet, allowing successful use over an extended period of time.

<Resin that is Liquid Under Normal Temperature and Pressure>

The resin, included in the thermally conductive sheet according to the present disclosure, that is liquid under normal temperature and pressure constitutes a matrix resin of the thermally conductive sheet together with the below-described resin that is solid under normal temperature and pressure. The resin that is liquid under normal temperature and pressure also functions as a binder that binds the particulate carbon material and the like in the thermally conductive sheet. If the thermally conductive sheet did not include the resin that is liquid under normal temperature and pressure, it would be difficult to provide the thermally conductive sheet with good flexibility, for example making it difficult to place the thermally conductive sheet and the adherends clamping the thermally conductive sheet successfully in close contact and thus making it difficult for the thermally conductive sheet to achieve high thermal conductivity at a relatively low clamping pressure.

Examples of the resin that is liquid under normal temperature and pressure include thermoplastic resins and thermosetting resins that are liquid under normal temperature and pressure. Among these, use of thermoplastic resins that are liquid under normal temperature and pressure as the resin that is liquid under normal temperature and pressure is preferable for placing the thermally conductive sheet and the adherends in closer contact and for dissipating heat successfully from the heating element during use of the thermally conductive sheet.

<<Thermoplastic Resins that are Liquid Under Normal Temperature and Pressure>>

Examples of thermoplastic resins that are liquid under normal temperature and pressure include acrylic resins, epoxy resins, silicone resins, and fluororesins. One of these thermoplastic resins may be used alone, or a combination of two or more may be used. Among these, a thermoplastic fluororesin that is liquid under normal temperature and pressure is preferably used as a thermoplastic resin that is liquid under normal temperature and pressure to improve the flame retardancy, heat resistance, oil resistance, and chemical resistance of the thermally conductive sheet.

<<Thermoplastic Fluororesins that are Liquid Under Normal Temperature and Pressure>>

Any thermoplastic fluororesin that is in a liquid state under normal temperature and pressure may be used as the thermoplastic fluororesin that is liquid under normal temperature and pressure. Examples of thermoplastic fluororesins that are liquid under normal temperature and pressure include a vinylidene fluoride-hexafluoropropylene copolymer, a vinylidene fluoride-hexafluoropentene-tetrafluoroethylene terpolymer, a perfluoropropene oxide polymer, and a tetrafluoroethylene-propylene-vinylidene fluoride copolymer.

Examples of commercially available thermoplastic fluororesins that are liquid under normal temperature and pressure include Viton® LM produced by DuPont, DAI-EL® G-101 produced by Daikin Industries, Ltd., DYNEON® FC2210 produced by 3M, and the SIFEL series produced by Shin-Etsu Chemicals, Co., Ltd. (Viton, DAI-EL and DYNEON are registered trademarks in Japan, other countries, or both).

The thermoplastic fluororesin that is liquid under normal temperature and pressure may have any viscosity, but the viscosity (viscosity coefficient) at a temperature of 80° C. is preferably at least 500 mPa·s and no greater than 30,000 mPa·s and more preferably at least 550 mPa·s and no greater than 25,000 mPa·s to achieve good kneadability, fluidity, and crosslinking reactivity and also excellent formability.

The molecular weight of the thermoplastic fluororesin that is liquid under normal temperature and pressure is typically lower than the molecular weight of the below-described thermoplastic fluororesin that is solid under normal temperature and pressure. Consequently, when both the thermoplastic fluororesin that is liquid and the thermoplastic fluororesin that is solid under normal temperature and pressure are included in the thermally conductive sheet, for example, two different peaks are obtained by using gel permeation chromatography (GPC), with the peak at the lower molecular weight typically indicating the thermoplastic fluororesin that is liquid under normal temperature and pressure, and the peak at the higher molecular weight indicating the thermoplastic fluororesin that is solid under normal temperature and pressure.

<<Thermosetting Resins that are Liquid Under Normal Temperature and Pressure>>

Examples of thermosetting resins that are liquid under normal temperature and pressure include natural rubbers, butadiene rubbers, isoprene rubbers, nitrile rubbers, hydrogenated nitrile rubbers, chloroprene rubbers, ethylene propylene rubbers, chlorinated polyethylene, chlorosulfonated polyethylene, butyl rubber, halogenated butyl rubbers, polyisobutylene rubbers, epoxy resins, polyimide resins, bismaleimide resins, benzocyclobutene resins, phenolic resins, unsaturated polyester, diallyl phthalate resins, polyimide silicone resins, polyurethanes, thermosetting polyphenylene ethers, and thermosetting modified polyphenylene ethers. One of these thermosetting resins may be used alone, or a combination of two or more may be used.

<<Percentage Content>>

The percentage content of the resin that is liquid under normal temperature and pressure is preferably at least 40 mass %, more preferably at least 50 mass %, even more preferably at least 60 mass %, preferably no greater than 90 mass %, more preferably no greater than 80 mass %, and even more preferably no greater than 75 mass % of the total content of the resin that is liquid under normal temperature and pressure and the below-described resin that is solid under normal temperature and pressure. Setting the percentage content of the resin that is liquid under normal temperature and pressure to be at least the aforementioned lower limits further improves the flexibility of the thermally conductive sheet and can, for example, further improve the close adherence between the thermally conductive sheet and the adherends clamping the thermally conductive sheet, allowing the thermally conductive sheet to achieve better thermal conductivity at a relatively low clamping pressure. Furthermore, setting the percentage content of the resin that is liquid under normal temperature and pressure to be no greater than the aforementioned upper limits can, for example, provide the thermally conductive sheet with better pump-out resistance even when the thermally conductive sheet is used by being clamped between a heating element and a heat dissipator.

<Resin that is Solid Under Normal Temperature and Pressure>

The resin, included in the thermally conductive sheet according to the present disclosure, that is solid under normal temperature and pressure constitutes a matrix resin of the thermally conductive sheet together with the above-described resin that is liquid under normal temperature and pressure. The resin that is solid under normal temperature and pressure also functions as a binder that binds the particulate carbon material and the like in the thermally conductive sheet. If the thermally conductive sheet did not include the resin that is solid under normal temperature and pressure, the thermally conductive sheet could not be provided with good pump-out resistance. If, for example, such a thermally conductive sheet were used by being clamped between adherends such as a heating element and a heat dissipator, it would be difficult to prevent the thermally conductive sheet from leaking and contaminating the adherends.

Examples of the resin that is solid under normal temperature and pressure include thermoplastic resins and thermosetting resins that are solid under normal temperature and pressure. Among these, use of thermoplastic resins that are solid under normal temperature and pressure as the resin that is solid under normal temperature and pressure is preferable for increasing the pump-out resistance of the thermally conductive sheet during use while also ensuring good, close contact between the thermally conductive sheet and the adherends.

<<Thermoplastic Resins that are Solid Under Normal Temperature and Pressure>>

Examples of thermoplastic resins that are solid under normal temperature and pressure include acrylic resins such as poly(acrylic acid 2-ethylhexyl), a copolymer of acrylic acid and acrylic acid 2-ethylhexyl, polymethacrylic acid or an ester thereof, or polyacrylic acid or an ester thereof; silicone resins; fluororesins; polyethylene; polypropylene; ethylene-propylene copolymer; polymethylpentene; polyvinyl chloride; polyvinylidene chloride; polyvinyl acetate; ethylene-vinyl acetate copolymer; polyvinyl alcohol; polyacetal; polyethylene terephthalate; polybutylene terephthalate; polyethylene naphthalate; polystyrene; polyacrylonitrile; styrene-acrylonitrile copolymer; acrylonitrile-butadiene-styrene copolymer (ABS resin); styrene-butadiene block copolymer or a hydrogenated product thereof; styrene-isoprene block copolymer or a hydrogenated product thereof; polyphenylene ethers; modified polyphenylene ethers; aliphatic polyamides; aromatic polyamides; polyamide imides; polycarbonates; polyphenylene sulfides; polysulfones; polyether sulfones; polyether nitriles; polyether ketones; polyketones; polyurethanes; liquid crystal polymers; and ionomers. One of these thermoplastic resins may be used alone, or a combination of two or more may be used.

Among these, a thermoplastic fluororesin that is solid under normal temperature and pressure is preferably used as a thermoplastic resin that is solid under normal temperature and pressure to improve the flame retardancy, heat resistance, oil resistance, and chemical resistance of the thermally conductive sheet.

<<Thermoplastic Fluororesins that are Solid Under Normal Temperature and Pressure>>

Any thermoplastic fluororesin that is in a solid state under normal temperature and pressure may be used as the thermoplastic fluororesin that is solid under normal temperature and pressure. Examples of thermoplastic fluororesins that are solid under normal temperature and pressure include elastomers that are obtained by polymerizing a fluorine-containing monomer, such as vinylidene fluoride fluororesins, tetrafluoroethylene-propylene fluororesins, and tetrafluoroethylene-perfluorovinyl ether fluororesins. More specific examples include polytetrafluoroethylene, tetrafluoroethylene-perfluoroalkyl vinyl ether copolymer, tetrafluoroethylene-hexafluoropropylene copolymer, tetrafluoroethylene-ethylene copolymer, polyvinylidene fluoride, polychlorotrifluoroethylene, ethylene-chlorofluoroethylene copolymer, tetrafluoroethylene-perfluorodioxole copolymer, polyvinyl fluoride, tetrafluoroethylene-propylene copolymer, vinylidene fluoride-hexafluoropropylene copolymer, vinylidene fluoride-tetrafluoroethylene-hexafluoropropylene copolymer, acrylic-modified polytetrafluoroethylene, ester-modified polytetrafluoroethylene, epoxy-modified polytetrafluoroethylene, and silane modified polytetrafluoroethylene. Among these, vinylidene fluoride-hexafluoropropylene copolymer is preferred for processability.

Examples of commercially available thermoplastic fluororesins that are solid under normal temperature and pressure include DAI-EL® G-912 and G-700 series, DAI-EL® G-550 series/G-600 series, and DAI-EL® G-310 produced by Daikin Industries, Ltd., the KYNAR® series and KYNAR FLEX® series (KYNAR and KYNAR FLEX are registered trademarks in Japan, other countries, or both) produced by Arkema, and DYNEON® FC2211, FPO3600ULV produced by 3M.

<<Thermosetting Resins that are Solid Under Normal Temperature and Pressure>>

Examples of thermosetting resins that are solid under normal temperature and pressure include natural rubbers, butadiene rubbers, isoprene rubbers, nitrile rubbers, hydrogenated nitrile rubbers, chloroprene rubbers, ethylene propylene rubbers, chlorinated polyethylene, chlorosulfonated polyethylene, butyl rubbers, halogenated butyl rubbers, polyisobutylene rubbers, epoxy resins, polyimide resins, bismaleimide resins, benzocyclobutene resins, phenolic resins, unsaturated polyester, diallyl phthalate resins, polyimide silicone resins, polyurethanes, thermosetting polyphenylene ethers, and thermosetting modified polyphenylene ethers. One of these thermosetting resins may be used alone, or a combination of two or more may be used.

<<Mooney Viscosity>>

The Mooney viscosity ($ML_{1+4}$, 100° C.) of the resin that is solid under normal temperature and pressure is preferably at least 3.5, more preferably at least 10, and even more preferably at least 20, and preferably no greater than 120, more preferably no greater than 100, even more preferably no greater than 70, still more preferably no greater than 50, and particularly preferably no greater than 30. Setting the Mooney viscosity of the resin that is solid under normal temperature and pressure to be at least the aforementioned lower limits can further improve the pump-out resistance of the thermally conductive sheet. Setting the Mooney viscosity of the resin that is solid under normal temperature and pressure to be no greater than the aforementioned upper limits can further improve the flexibility of the thermally conductive sheet and can further improve the thermal conductivity of the thermally conductive sheet even during use at a relatively low clamping pressure.

<Particulate Carbon Material>

Any particulate carbon material may be included in the thermally conductive sheet according to the present disclosure. Examples include graphite, such as artificial graphite, flake graphite, exfoliated graphite, natural graphite, acid-treated graphite, expandable graphite, and expanded graphite; and carbon black. One type of graphite may be used alone, or a combination of two or more may be used.

Among these, use of expanded graphite is preferable as the particulate carbon material. By using expanded graphite, the thermal conductivity of the thermally conductive sheet can be further improved.

<<Expanded Graphite>>

The expanded graphite can, for example, be obtained by subjecting graphite, such as flake graphite, to chemical treatment with sulfuric acid or the like to obtain expandable graphite, causing the expandable graphite to expand by heat treatment, and refining the result. Examples of expanded graphite include EC1500, EC1000, EC500, EC300, EC100, and EC50 (all product names) produced by Ito Graphite Co., Ltd.

<<Average Particle Diameter>>

The average particle diameter of the particulate carbon material is preferably a volume-average particle diameter of at least 1 μm, more preferably at least 10 μm, and preferably no greater than 500 μm, more preferably no greater than 300 μm. Setting the average particle diameter of the particulate carbon material to be at least the aforementioned lower limits forms a better heat transfer path for the particulate carbon material in the thermally conductive sheet and allows the thermally conductive sheet to achieve better thermal conductivity even at a relatively low clamping pressure. Setting the average particle diameter of the particulate carbon material to be no greater than the aforementioned upper limits can ensure good flexibility of the thermally conductive sheet and improve flame retardancy.

The "volume-average particle diameter" in the present disclosure can, for example, be calculated using a laser diffraction/scattering type particle size distribution measurement apparatus (model "LA-960" produced by Horiba, Ltd.) as the particle size (D50) at which the cumulative volume, calculated from the small diameter side, reaches 50% in the particle size distribution measured using a laser diffraction method. The average particle diameter of the particulate carbon material may be measured in any appropriate way, such as removing the particulate carbon material from the thermally conductive sheet by an appropriate method such as dissolving the resin included in the thermally conductive sheet using a good solvent for the resin.

<<Aspect Ratio>>

The aspect ratio (major axis/minor axis) of the particulate carbon material is preferably at least 1 and no greater than 10, more preferably at least 1 and no greater than 5.

In the present disclosure, the "aspect ratio of the particulate carbon material" can be calculated by observing a cross-section in the thickness direction of the thermally conductive sheet with a scanning electron microscope (SEM), measuring the maximum diameter (major axis) and the particle diameter in a direction orthogonal to the maximum diameter (minor axis) of any 50 pieces of particulate carbon material, and calculating the average of the ratio between the major axis and the minor axis (major axis/minor axis).

<<Percentage Content>>

The percentage content of the particulate carbon material in the thermally conductive sheet is preferably at least 25 volume % and preferably no greater than 40 volume %, more preferably no greater than 35 volume %. Setting the percentage content of the particulate carbon material to be at least the aforementioned lower limit forms a better heat transfer path for the particulate carbon material in the thermally conductive sheet, thereby allowing the thermally conductive sheet to achieve better thermal conductivity even at a relatively low clamping pressure. Additionally, setting the percentage content of the particulate carbon material to be at least the aforementioned lower limit can further improve the pump-out resistance of the thermally conductive sheet. Setting the percentage content of the particulate carbon material to be no greater than the aforementioned upper limits also further increases the flexibility of the thermally conductive sheet and places the thermally conductive sheet and the adherends in closer contact, thereby allowing the thermally conductive sheet to achieve better thermal conductivity even at a relatively low clamping pressure. Additionally, setting the percentage content of the particulate carbon material to be no greater than the aforementioned upper limits can, for example, suppress dripping of the particulate carbon material in the thermally conductive sheet when the sheet is ignited and provide the thermally conductive sheet with greater flame retardancy.

<Other Components>

The thermally conductive sheet according to the present disclosure may optionally further include other components, such as a fibrous carbon material and additives, in addition to the above-described resin that is liquid under normal temperature and pressure, resin that is solid under normal temperature and pressure, and particulate carbon material.

<<Fibrous Carbon Material>>

The thermally conductive sheet according to the present disclosure may further include any type of fibrous carbon material, examples of which include carbon nanotubes, vapor grown carbon fiber, carbon fiber obtained by carbonizing organic fiber, and cut-off pieces of these materials. One type of fibrous carbon material may be used alone, or a combination of two or more may be used.

For example, further including fibrous carbon material in the thermally conductive sheet can further improve the thermal conductivity of the thermally conductive sheet while also preventing the particulate carbon material from falling off. The reason that inclusion of fibrous carbon material prevents the particulate carbon material from falling off is not clear but is inferred to be because the fibrous carbon material forms a three-dimensional network, thereby improving the thermal conductivity and strength while preventing separation of the particulate carbon material.

Among the above-described examples, fibrous carbon nanostructures such as carbon nanotubes (CNT) are preferably used as the fibrous carbon material, and fibrous carbon nanostructures including CNT are more preferably used. Using fibrous carbon nanostructures that include CNT can further improve the thermal conductivity and the strength of the thermally conductive sheet at a relatively low clamping pressure.

[Fibrous Carbon Nanostructures Including CNT]

The fibrous carbon nanostructures including CNT that can be used suitably as the fibrous carbon material may be composed entirely of CNT or may be a mixture of CNT and fibrous carbon nanostructures other than CNT.

Any CNT may be used in the fibrous carbon nanostructures, such as single-walled carbon nanotubes and/or multi-walled carbon nanotubes. However, the CNT are preferably carbon nanotubes having from 1 to 5 walls and are more preferably single-walled carbon nanotubes. The use of single-walled carbon nanotubes can further improve the thermal conductivity and strength of the thermally conductive sheet as compared to the use of multi-walled carbon nanotubes.

[Aspect Ratio]

The aspect ratio (major axis/minor axis) of the fibrous carbon material preferably exceeds 10.

In the present disclosure, the "aspect ratio of the fibrous carbon material" can be calculated by measuring the maximum diameter (major axis) and the particle diameter in a direction orthogonal to the maximum diameter (minor axis) of 100 randomly selected pieces of fibrous carbon material using a transmission electron microscope (TEM) and calculating the average of the ratio between the major axis and the minor axis (major axis/minor axis).

[Specific Surface Area]

The specific surface area of the fibrous carbon material is preferably at least 300 $m^2/g$, more preferably at least 600 $m^2/g$, and preferably no greater than 2,500 $m^2/g$, more preferably no greater than 1,200 $m^2/g$. Setting the specific surface area of the fibrous carbon material to be at least the aforementioned lower limits can allow the fibrous carbon material in the thermally conductive sheet to form a better three-dimensional network. The pump-out resistance and the thermal conductivity of the thermally conductive sheet can thus be made more compatible, while also improving the flame retardancy of the thermally conductive sheet. Setting the specific surface area of the fibrous carbon material to be no greater than the aforementioned upper limits can suppress aggregation of the fibrous carbon material, thereby improving the dispersibility of the fibrous carbon material in the thermally conductive sheet.

In the present disclosure, the specific surface area of the fibrous carbon material refers to the "BET specific surface area" and represents the nitrogen adsorption specific surface area measured using the BET method.

<<Preparation of Fibrous Carbon Material>>

Commercially available fibrous carbon material may be used, and fibrous carbon nanostructures including CNT may, for example, be manufactured efficiently in accordance with the super growth method (see WO2006/011655). Hereinafter, carbon nanotubes that are obtained by the super growth method are also referred to as "SGCNT".

The fibrous carbon nanostructures that include SGCNT manufactured by the super growth method may be composed entirely of SGCNT or may include, in addition to SGCNT, other carbon nanostructures such as non-tubular carbon nanostructures.

<<Percentage Content of Fibrous Carbon Material>>

The percentage content of the fibrous carbon material in the thermally conductive sheet is preferably at least 0.15 parts by mass, more preferably at least 0.3 parts by mass, and preferably no greater than 1.0 parts by mass, more preferably no greater than 0.5 parts by mass, per 100 parts by mass of the total content of the resin that is liquid under normal temperature and pressure and the resin that is solid under normal temperature and pressure in the thermally conductive sheet. Setting the percentage content of the fibrous carbon material to be at least the aforementioned lower limits forms an even better heat transfer path in the thermally conductive sheet, thereby further improving the thermal conductivity and increasing the strength of the thermally conductive sheet. While the reason is unclear, setting the percentage content of the fibrous carbon material to be at least the aforementioned lower limits can also increase the flame retardancy even in a thin thermally conductive sheet. Furthermore, setting the percentage content of the fibrous carbon material to be at most the aforementioned upper limits can suppress a reduction in flexibility of the thermally conductive sheet due to compounding of the fibrous carbon material, thereby better achieving both flexibility and heat conductivity of the thermally conductive sheet.

<Additives>

As necessary, any known additives that can be used in formation of thermally conductive sheets may be further compounded into the thermally conductive sheet. Non-limiting examples of additives that can be compounded into the thermally conductive sheet include flame retardants such as red phosphorus flame retardants; plasticizers such as phosphate ester plasticizers; moisture absorbents such as calcium oxide and magnesium oxide; adhesion enhancers such as a silane coupling agent, a titanium coupling agent, and an acid anhydride; wettability enhancers such as non-ionic surfactants and fluorine surfactants; ion trapping agents such as inorganic ion exchangers; and particulate carbon material.

The flexibility of the thermally conductive sheet can typically be increased easily by compounding a plasticizer into the thermally conductive sheet. However, when compounding a liquid plasticizer, such as a phosphate ester plasticizer, into the thermally conductive sheet, the pump-out resistance of the thermally conductive sheet may reduce dramatically as more of the plasticizer is compounded.

In contrast, the thermally conductive sheet according to the present disclosure includes a resin that is liquid under normal temperature and pressure in addition to a resin that is solid under normal temperature and pressure and particulate carbon material, thereby ensuring high flexibility even when not compounding a plasticizer, in particular a liquid plasticizer.

<Method of Forming Thermally Conductive Sheet>

The thermally conductive sheet according to the present disclosure may be formed by any appropriate method, such as through a pre-thermally conductive sheet molding process, laminate formation process, and slicing process in accordance with the method disclosed in WO2016/185688.

<<Pre-Thermally Conductive Sheet Molding Process>>

In the pre-thermally conductive sheet molding process, a composition including a resin that is liquid under normal temperature and pressure, a resin that is solid under normal temperature and pressure, and particulate carbon material, and further including optional components such as fibrous carbon material and additives, is pressurized to mold the composition into a sheet, thereby obtaining a pre-thermally conductive sheet.

[Composition]

The composition can be prepared by mixing a resin that is liquid under normal temperature and pressure, a resin that is solid under normal temperature and pressure, particulate carbon material, and the above-described optional components (fibrous carbon material, additives, and the like). The components described above as the resin that is liquid under normal temperature and pressure, the resin that is solid under normal temperature and pressure, the particulate carbon material, and the optional fibrous carbon material and additives included in the thermally conductive sheet according to the present disclosure may be used as the resin that is liquid under normal temperature and pressure, the resin that is solid under normal temperature and pressure, the particulate carbon material, and the optional fibrous carbon material and additives of the composition.

The above-described components may be mixed in any way, for example by using a known mixing apparatus such as a kneader, a roller, or a mixer. The components may be mixed in the presence of an organic solvent or other solvent. The mixing time can, for example, be 5 minutes or more to 60 minutes or less. The mixing temperature can, for example, be 5° C. or higher to 150° C. or lower.

[Molding of Composition]

After optional defoaming and crushing, the composition prepared in the above-described way can be pressurized (primary pressurization) for molding into a sheet.

Any molding method that applies pressure to the composition may be used for molding into a sheet, such as pressing, rolling, extrusion, or another such known method. Among these methods, the composition is preferably molded into a sheet by rolling, and more preferably molded into a sheet by passing the composition between rollers while the composition is held between protective films. Any protective film may be used, such as a sandblasted polyethylene terephthalate (PET) film. The rolling temperature can be 5° C. or higher to 150° C.

[Pre-Thermally Conductive Sheet]

In the pre-thermally conductive sheet molded into a sheet by pressurizing the composition, it is inferred that principally the particulate carbon material and the optional fibrous carbon material are arrayed in the in-plane direction, and that the thermal conductivity improves particularly in the in-plane direction.

The pre-thermally conductive sheet may have any thickness, such as a thickness of 0.05 mm or greater to 2 mm or less.

<<Laminate Formation Process>>

In the laminate formation process, a plurality of pre-thermally conductive sheets obtained in the pre-thermally conductive sheet molding process are stacked in the thickness direction, or a pre-thermally conductive sheet is folded or wrapped, yielding a laminate.

To further increase the adhesive strength between surfaces of the pre-thermally conductive sheets and sufficiently suppress layer peeling in the laminate obtained in the laminate formation process, the laminate formation process may be performed after slightly dissolving the surface of the pre-thermally conductive sheets with a solvent, the laminate formation process may be performed after applying adhesive or providing an adhesive layer on the surface of the pre-thermally conductive sheets, or the laminate in which the pre-thermally conductive sheets are stacked may be additionally hot-pressed (secondary pressurization) in the stacking direction.

To suppress layer peeling efficiently, the resulting laminate is preferably subjected to secondary pressurization in the stacking direction. While the conditions of the secondary pressurization are not restricted, the pressure in the stacking direction may be 0.05 MPa or greater to 0.5 MPa or less, the temperature may be 80° C. or higher to 170° C. or lower, and the duration may be from 10 seconds to 30 minutes.

In the laminate obtained by stacking, folding, or wrapping the pre-thermally conductive sheets, it is inferred that the particulate carbon material and the optional fibrous carbon material are arrayed in a direction substantially orthogonal to the stacking direction.

<<Slicing Process>>

During the slicing process, the laminate obtained by the laminate formation process is sliced at an angle of 45° or less relative to the stacking direction to obtain a thermally conductive sheet consisting of a slice of the laminate. Any appropriate method may be used to slice the laminate, such as a multi-blade method, a laser processing method, a water jet method, or a knife processing method. Among these methods, the knife processing method is preferable for easily allowing the thickness of the thermally conductive sheets to be made uniform. Any cutting tool may be used to slice the laminate, such as a slicing member that includes a smooth surface with a slit and a blade projecting through the slit (such as a plane or slicer provided with a sharp blade).

To improve the thermal conductivity of the thermally conductive sheet, the angle for slicing the laminate is preferably at most 30° relative to the stacking direction, more preferably at most 15° relative to the stacking direction, and preferably substantially 0° relative to the stacking direction (i.e. along the stacking direction).

To slice the laminate easily, the temperature of the laminate at the time of slicing is preferably at least −20° C. and no higher than 30° C. For the same reasons, the laminate to be sliced is preferably sliced while pressure is applied in a direction perpendicular to the stacking direction and more preferably sliced while a pressure of at least 0.1 MPa and no greater than 0.5 MPa is applied in a direction perpendicular to the stacking direction. The thermally conductive sheet obtained by the above-described formation method has a structure in which strips including predetermined resins and particulate carbon material are joined in parallel.

<Properties of Thermally Conductive Sheet>
<<Thermal Resistance>>

The thermal resistance of the thermally conductive sheet according to the present disclosure under a pressure of 0.05 MPa needs to be at most 0.30° C/W. The thermal resistance of the thermally conductive sheet according to the present disclosure under a pressure of 0.05 MPa is preferably at most 0.20° C/W, more preferably at most 0.18° C/W, and even more preferably at most 0.16° C/W. Manufacturing the thermally conductive sheet using the above-described predetermined components so that the thermal resistance under a pressure of 0.05 MPa is at most the aforementioned upper limits reliably allows the thermally conductive sheet to achieve excellent thermal conductivity when used at a relatively low clamping pressure.

The thermal resistance of the thermally conductive sheet can be adjusted by, for example, adjusting the ratio of the contents of the above-described resin that is liquid under normal temperature and pressure and resin that is solid under normal temperature and pressure, the content of the above-described particulate carbon material, and the like.

<<Thickness>>

The thickness of the thermally conductive sheet according to the present disclosure is preferably no greater than 400 μm, more preferably no greater than 300 μm, even more preferably no greater than 200 μm, and preferably at least 50 μm. Even when the thermally conductive sheet is used between adherends at a relatively low clamping pressure, for example, setting the thickness to a low value no greater than the aforementioned upper limits allows the thermally conductive sheet to follow the shape of the adherends better and improves the close adherence, thereby further improving the thermal conductivity of the thermally conductive sheet. Setting the thickness to be at least the aforementioned lower limits ensures the strength and handleability of the thermally conductive sheet without making the thermally conductive sheet excessively thin.

<<Hardness>>

The thermally conductive sheet according to the present disclosure preferably has an Asker C hardness at 25° C. of at least 60, more preferably at least 65, and preferably no greater than 80, more preferably no greater than 70. Setting the hardness to be at least the aforementioned lower limits further improves the pump-out resistance of the thermally conductive sheet. Furthermore, setting the hardness to be no greater than the aforementioned upper limits further increases the flexibility of the thermally conductive sheet, thereby further improving the thermal conductivity at a relatively low clamping pressure.

In the present disclosure, the "Asker C hardness" can be measured in accordance with the Asker C method of the Japanese Society of Rubber Science and Technology Standards (SRIS 0101) using a hardness meter.

EXAMPLES

Hereinafter, the present disclosure will be specifically described with reference to Examples; however, the disclosure is not limited to the Examples. In the following, "%" and "parts" used to express quantities are by mass, unless otherwise specified.

In the Examples and the Comparative Examples, the viscosity of the resin that is liquid under normal temperature and pressure; the Mooney viscosity of the resin that is solid under normal temperature and pressure; the percentage content of the particulate carbon material in the thermally conductive sheet; and the thickness, pump-out resistance, thermal resistance, and flame retardancy of the thermally conductive sheet were measured or assessed in accordance with the following methods.

<Viscosity of Resin that is Liquid Under Normal Temperature and Pressure>

The viscosity (mPa·s) of the resin that is liquid under normal temperature and pressure was measured at a temperature of 80° C. using an E-type viscometer (Brookfield digital viscometer model DV-II Pro produced by Brookfield)

<Mooney Viscosity of Resin that is Solid Under Normal Temperature and Pressure>

The Mooney viscosity ($ML_{1+4}$, 100° C.) of the resin that is solid under normal temperature and pressure was measured using a Mooney viscometer (Mooney Viscometer SMV-202, produced by Shimadzu Corporation), in accordance with JIS-K6300, at a temperature of 100° C. A lower Mooney viscosity of the resin that is solid under normal temperature and pressure typically indicates a higher flexibility.

<Percentage Content of Particulate Carbon Material>

The theoretical value in volume fraction was used as the percentage content of the particulate carbon material in the thermally conductive sheet. In greater detail, for the resin that is liquid under normal temperature and pressure, the resin that is solid under normal temperature and pressure, the particulate carbon material, and the optional fibrous carbon material and additives included in the thermally conductive sheet, the volume ($cm^3$) was calculated from the density ($g/cm^3$) and compounding amount (g) for each component, and the percentage content of the particulate carbon material in the thermally conductive sheet was calculated in volume fraction (volume %).

<Thickness>

The thickness of the thermally conductive sheet was calculated using a film thickness meter (Digimatic Indicator ID-C112XBS, produced by Mitutoyo Corporation). The average (μm) of values measured at five arbitrary locations on the surface of the thermally conductive sheet was taken as the thickness of the thermally conductive sheet.

<Pump-Out Resistance>

The pump-out resistance of the thermally conductive sheet was measured as follows.

Two 50 mm square copper plates and two pieces of copper foil each with one rough surface (rough copper foil) were first prepared. One piece of rough copper foil was placed on one copper plate with the rough surface facing upwards, and a thermally conductive sheet cut to a square size of 10 mm×10 mm was placed on the rough surface of the rough copper foil, substantially in the center. Subsequently, the other piece of rough copper foil was placed on the thermally conductive sheet with the rough surface facing downwards, and the other copper plate was placed on top of the rough copper foil. A laminate in which the thermally conductive sheet was clamped between the rough surface sides of the pieces of rough copper foil and also between copper plates, in the order of copper plate/rough copper foil/thermally conductive sheet/rough copper foil/copper plate, was thus obtained as a test specimen. Next, a 500 g weight was placed on the resulting test specimen, and the test specimen was held for 72 hours in a thermostatic chamber at a temperature of 150° C. At this time, the pressure on the thermally conductive sheet clamped between the copper plates and the rough copper foil was 0.05 MPa. After holding for 72 hours, the copper plates and copper foil of the test specimen were peeled off from the thermally conductive sheet, the "stains" over the rough surfaces of the two pieces of rough copper foil were observed visually, and the average (mm) of the maximum diameter of the outline of the "stains" was measured. The "stains" were formed by spreading as substantially concentric circles and could be approximated to circles or ellipses. The average was evaluated according to the following criteria. When approximating to an ellipse, the major axis was used for evaluation.

A smaller average for the maximum diameter indicates that the thermally conductive sheet has better pump-out resistance. The pump-out resistance can be considered relatively good if the following evaluation of the thermally conductive sheet is AA, A, or B.

AA: average of maximum diameter is less than 15 mm

A: average of maximum diameter is at least 15 mm and less than 20 mm

B: average of maximum diameter is at least 20 mm and less than 25 mm

C: average of maximum diameter is at least 25 mm

<Thermal Resistance>

The thermal resistance of the thermally conductive sheet was measured using a resin material thermal resistance tester ("C47108", produced by Hitachi Technologies and Services, Ltd.). The thermally conductive sheet was cut into a substantially square sample, measuring 1 cm square, and at a sample temperature of 50° C., the thermal resistance (° C/W) when applying a relatively low pressure of 0.05 MPa was measured. A smaller thermal resistance indicates better thermal conductivity of the thermally conductive sheet, such as better heat dissipation properties when used between a heating element and a heat dissipator as a heat dissipating device.

<Flame Retardancy>

Ten test specimens were prepared by cutting the thermally conductive sheet into 125 mm long×13 mm wide pieces. Five of the test specimens were held for 48 hours (I) in an environment at a temperature of 23° C. and a relative humidity of 50%. The remaining five test specimens were held for 168 hours in an environment at a temperature of 70° C. and then aged (II). Two sets of five test specimens processed differently were thus prepared.

Next, from each set of test specimens, one test specimen at a time was lifted vertically and supported by a fastening clamp, and absorbent cotton was placed approximately 300 mm below the supported test specimen. The flow of air and gas in a Bunsen burner was adjusted to yield a blue flame approximately 20 mm high, and the flame of the Bunsen burner was placed in contact with the bottom edge of the vertically supported test specimen (with an overlap of approximately 10 mm between the flame and the test specimen) and held for 10 seconds. The flame of the Bunsen burner was then separated from the test specimen. Subsequently, as soon as the test specimen stopped burning, the flame of the Bunsen burner was again placed in contact with the test specimen, held for another 10 seconds, and then separated from the test specimen. The afterflame time (the length of time the test specimen burned with a flame) after the first ignition, the afterflame time after the second ignition, the second flameless combustion time (the length of time the test specimen burned without a flame after removal of the flame), whether the test specimen burned up to the fastening clamp, whether a drip fell from the test specimen and caused the absorbent cotton to ignite, and whether a drip fell from the test specimen while the test specimen was flaming were all confirmed. Evaluation was then made in accordance with the UL 94 standard V test (vertical burn test).

Specifically, it was determined whether each of the two sets of five test specimens satisfied the following five conditions: (1) the afterflame time after both the first and second ignitions of each test specimen was within 10 seconds, (2) the total afterflame time after ignition of the five test specimens was within 50 seconds, (3) no test specimen exhibited combustion or flameless combustion up to the position of the fastening clamp, (4) no drips ignited the absorbent cotton, and (5) the flameless combustion time after the second ignition was within 30 seconds. A set of test specimens was considered to satisfy V-0 grade when satisfying the above conditions. A thermally conductive sheet can be considered to have excellent flame retardancy when all test specimens subjected to 48 hour holding (I) and aging (II) satisfy V-0 grade.

V-0: satisfies V-0 grade

Non-standard: does not satisfy V-0 grade

Example 1

<Preparation of Readily Dispersible Aggregate of Fibrous Carbon Nanostructures>

<<Preparation of Dispersion Liquid>>

First, 400 mg of fibrous carbon nanostructures (SGCNT, Zeon Corporation, specific surface area: 600 m$^2$/g) was weighed and mixed into a methyl ethyl ketone 2 L solvent. The result was stirred for 2 minutes with a homogenizer to yield a coarse dispersion liquid. Next, using a wet jet mill ("JN-20" produced by JOKOH Co., Ltd.), the resulting coarse dispersion liquid was subjected to two cycles at a pressure of 100 MPa in a 0.5 mm flow path of the wet jet mill to disperse the fibrous carbon nanostructures in the methyl ethyl ketone. A dispersion liquid with a solid content concentration of 0.20% was obtained.

<<Solvent Removal>>

Subsequently, the dispersion liquid obtained as described above was filtered under reduced pressure using Kiriyama filter paper (No. 5A) to yield a readily dispersible aggregate of fibrous carbon nanostructures in sheet form as fibrous carbon material.

<Preparation of Composition>

Using a pressure kneader (produced by Nihon Spindle Manufacturing Co., Ltd.), the following were mixed by stirring for 20 minutes at a temperature of 150° C.: 70 parts of a thermoplastic fluororesin that is liquid under normal temperature and pressure ("DAI-EL® G-101" produced by Daikin Industries, Ltd.), 30 parts of a thermoplastic fluororesin that is solid under normal temperature and pressure ("DYNEON® FC2211" produced by 3M, Mooney viscosity: 27 ML$_{1+4}$, 100° C.), 50 parts of expanded graphite as particulate carbon material ("EC50" produced by Ito Graphite Co., Ltd, volume-average particle diameter: 250 µm), and 0.5 parts of the readily dispersible aggregate of fibrous carbon nanostructures, obtained as described above, as fibrous carbon material. Next, the resulting mixture was charged into a pulverizer and pulverized for 10 seconds to obtain a composition.

<Formation of Pre-Thermally Conductive Sheet>

Next, 50 g of the resulting composition was held between 50 µm thick, sandblasted PET films (protective films) and rolled (primary pressurization) under the conditions of a roller gap of 550 µm, a rolling temperature of 50° C., a linear pressure of 50 kg/cm, and a rolling speed of 1 m/min to yield a 0.5 mm thick pre-thermally conductive sheet.

<Formation of Laminate>

Next, the resulting pre-thermally conductive sheet was cut to be 150 mm high×150 mm wide×0.5 mm thick, and 120 of the pre-thermally conductive sheets were stacked in the thickness direction thereof and pressed (secondary pressurization) in the stacking direction for 3 minutes at a temperature of 120° C. and a pressure of 0.1 MPa to yield an approximately 60 mm high laminate.

<Formation of Thermally Conductive Sheet>

Subsequently, while pressing the stacked side of the laminate after secondary pressurization with a pressure of 0.3 MPA, a woodworking slicer ("Super Surfacer Super Meca S" produced by Marunaka Tekkosho Inc.) was used to slice the laminate at an angle of 0° relative to the stacking direction (in other words, in the direction of the normal to the principal surface of the stacked pre-thermally conductive sheets) to obtain a thermally conductive sheet measuring 150 mm high×60 mm wide×0.15 mm thick.

In accordance with the above-described methods, the thickness, pump-out resistance, thermal resistance, and flame retardancy of the resulting thermally conductive sheet were measured. The results are given in Table 1.

Example 2

A readily dispersible aggregate of fibrous carbon nanostructures, a composition, a pre-thermally conductive sheet, a laminate, and a thermally conductive sheet were produced in the same way as in Example 1, except that in preparing the composition, the amount of thermoplastic fluororesin that is liquid under normal temperature and pressure ("DAI-EL® G-101" produced by Daikin Industries, Ltd.) was changed to 50 parts, and the amount of thermoplastic fluororesin that is solid under normal temperature and pressure ("DYNEON® FC2211" produced by 3M, Mooney viscosity: 27 ML$_{1+4}$, 100° C.) was changed to 50 parts.

The properties were then measured in the same manner as for Example 1. The results are given in Table 1.

Example 3

A readily dispersible aggregate of fibrous carbon nanostructures, a composition, a pre-thermally conductive sheet, a laminate, and a thermally conductive sheet were produced in the same way as in Example 1, except that in preparing the composition, the amount of thermoplastic fluororesin that is liquid under normal temperature and pressure ("DAI-EL® G-101" produced by Daikin Industries, Ltd.) was changed to 80 parts, and the amount of thermoplastic fluororesin that is solid under normal temperature and pressure ("DYNEON® FC2211" produced by 3M) was changed to 20 parts.

The properties were then measured in the same manner as for Example 1. The results are given in Table 1.

Example 4

A readily dispersible aggregate of fibrous carbon nanostructures, a composition, a pre-thermally conductive sheet, a laminate, and a thermally conductive sheet were produced in the same way as in Example 1, except that in preparing the composition, the type of thermoplastic fluororesin that is solid under normal temperature and pressure was changed to "FPO3600ULV" (Mooney viscosity: 3.5 ML$_{1+4}$, 100° C.) produced by 3M.

The properties were then measured in the same manner as for Example 1. The results are given in Table 1.

Example 5

A readily dispersible aggregate of fibrous carbon nanostructures, a composition, a pre-thermally conductive sheet, a laminate, and a thermally conductive sheet were produced in the same way as in Example 1, except that in preparing the composition, the type of thermoplastic fluororesin that is solid under normal temperature and pressure was changed to "DAI-EL® G-310" (Mooney viscosity: 63 ML$_{1+4}$, 100° C.) produced by Daikin Industries, Ltd.

The properties were then measured in the same manner as for Example 1. The results are given in Table 1.

Example 6

A readily dispersible aggregate of fibrous carbon nanostructures, a composition, a pre-thermally conductive sheet, a laminate, and a thermally conductive sheet were produced in the same way as in Example 1, except that in preparing the composition, the type of thermoplastic fluororesin that is solid under normal temperature and pressure was changed to "DAI-EL® G-912" (Mooney viscosity: 120 $ML_{1+4}$, 100° C.) produced by Daikin Industries, Ltd.

The properties were then measured in the same manner as for Example 1. The results are given in Table 1.

Example 7

A readily dispersible aggregate of fibrous carbon nanostructures, a composition, a pre-thermally conductive sheet, a laminate, and a thermally conductive sheet were produced in the same way as in Example 1, except that in preparing the composition, the amount of expanded graphite as particulate carbon material ("EC50" produced by Ito Graphite Co., Ltd, volume-average particle diameter: 250 μm) was changed to 70 parts.

The properties were then measured in the same manner as for Example 1. The results are given in Table 1.

Comparative Example 1

A readily dispersible aggregate of fibrous carbon nanostructures, a composition, a pre-thermally conductive sheet, a laminate, and a thermally conductive sheet were produced in the same way as in Example 1, except that in preparing the composition, no thermoplastic fluororesin that is solid under normal temperature and pressure was used, and the amount of thermoplastic fluororesin that is liquid under normal temperature and pressure ("DAI-EL® G-101" produced by Daikin Industries, Ltd.) was changed to 100 parts.

The properties were then measured in the same manner as for Example 1. The results are given in Table 1.

Comparative Example 2

A readily dispersible aggregate of fibrous carbon nanostructures, a composition, a pre-thermally conductive sheet, a laminate, and a thermally conductive sheet were produced in the same way as Example 2, except that in preparing the composition, the amount of expanded graphite as particulate carbon material ("EC50" produced by Ito Graphite Co., Ltd, volume-average particle diameter: 250 μm) was changed to 100 parts.

The properties were then measured in the same manner as for Example 1. The results are given in Table 1.

Comparative Example 3

A solution of thermoplastic fluororesin that is solid under normal temperature and pressure was prepared as follows. A composition was also prepared as follows. Furthermore, a readily dispersible aggregate of fibrous carbon nanostructures, a composition, a pre-thermally conductive sheet, a laminate, and a thermally conductive sheet were produced in the same way as in Example 1, except that formation of the thermally conductive sheet was adjusted to produce a thermally conductive sheet with a sheet thickness of 0.5 mm.

The properties were then measured in the same manner as for Example 1. The results are given in Table 1.

<Preparation of a Solution of Thermoplastic Fluororesin that is Solid Under Normal Temperature and Pressure>

First, 60 g of a thermoplastic fluororesin that is solid under normal temperature and pressure ("DAI-EL® G-912" produced by Daikin Industries, Ltd., Mooney viscosity: 120 $ML_{1+4}$, 100° C.) was cut with scissors into resin pieces the size of rice grains and placed in 60 g of methyl ethyl ketone (produced by Wako Pure Chemical Industries, Ltd.). The resulting mixture was stirred for three hours and was considered to be a solution of a thermoplastic fluororesin that is solid under normal temperature and pressure once the resin pieces were no longer visible.

<Preparation of Composition>

Using a Hobart mixer ("ACM-5LVT" produced by Kodaira Seisakusho Co., Ltd.), the following were mixed by stirring for one hour at a normal temperature: 80 parts in solid content of the solution of a thermoplastic fluororesin that is solid under normal temperature and pressure obtained as described above, 120 parts of expanded graphite as particulate carbon material ("EC50" produced by Ito Graphite Co., Ltd, volume-average particle diameter: 250 μm), 0.5 parts of readily dispersible aggregate of fibrous carbon nanostructures, and 20 parts of phosphate ester as a plasticizer, without inclusion of a thermoplastic fluororesin that is liquid under normal temperature and pressure. The resulting mixture was subjected to vacuum defoaming for one hour, and the methyl ethyl ketone was removed at the same time as the defoaming. The mixture with the methyl ethyl ketone removed was charged into a pulverizer and pulverized for 10 seconds to obtain a composition.

TABLE 1

| | | | Example 1 | Example 2 | Example 3 | Example 4 | Example 5 | Example 6 |
|---|---|---|---|---|---|---|---|---|
| Thermally conductive sheet | thermoplastic fluororesin that is liquid under normal temperature and pressure (viscosity: 12,700 mPa · s, 80° C.) [parts by mass] | | 70 | 50 | 80 | 70 | 70 | 70 |
| | thermoplastic fluororesin that is solid under normal temperature and pressure | Mooney viscosity: 3.5 [$ML_{1+4}$, 100° C.] [parts by mass] | 0 | 0 | 0 | 30 | 0 | 0 |
| | | Mooney viscosity: 27 [$ML_{1+4}$, 100° C.] [parts by mass] | 30 | 50 | 20 | 0 | 0 | 0 |
| | | Mooney viscosity: 63 [$ML_{1+4}$, 100° C.] [parts by mass] | 0 | 0 | 0 | 0 | 30 | 0 |
| | | Mooney viscosity: 120 [$ML_{1+4}$, 100° C.] [parts by mass] | 0 | 0 | 0 | 0 | 0 | 30 |
| | particulate carbon material | expanded graphite (volume-average particle diameter: 250 μm) [parts by mass] | 50 | 50 | 50 | 50 | 50 | 50 |

TABLE 1-continued

|  |  | | | | | | |
|---|---|---|---|---|---|---|---|
| fibrous carbon material | readily dispersible aggregate of fibrous carbon nanostructures (specific surface area: 600 m²/g) [parts by mass] | 0.5 | 0.5 | 0.5 | 0.5 | 0.5 | 0.5 |
| plasticizer | phosphate ester [parts by mass] | 0 | 0 | 0 | 0 | 0 | 0 |
| percentage content of particulate carbon material in thermally conductive sheet [volume %] | | 28 | 28 | 28 | 28 | 28 | 28 |
| thickness [µm] | | 150 | 150 | 150 | 150 | 150 | 150 |
| Evaluation items | pump-out resistance | A | AA | B | B | A | A |
|  | thermal resistance under a pressure of 0.05 MPa [W/° C.] | 0.159 | 0.216 | 0.151 | 0.148 | 0.181 | 0.198 |
|  | flame retardancy | V-0 | V-0 | V-0 | V-0 | V-0 | V-0 |

|  |  | | Example 7 | Comparative Example 1 | Comparative Example 2 | Comparative Example 3 |
|---|---|---|---|---|---|---|
| Thermally conductive sheet | thermoplastic fluororesin that is liquid under normal temperature and pressure (viscosity: 12,700 mPa · s, 80° C.) [parts by mass] | | 70 | 100 | 50 | 0 |
|  | thermoplastic fluororesin that is solid under normal temperature and pressure | Mooney viscosity: 3.5 [ML$_{1+4}$, 100° C.] [parts by mass] | 0 | 0 | 0 | 0 |
|  |  | Mooney viscosity: 27 [ML$_{1+4}$, 100° C.] [parts by mass] | 30 | 0 | 50 | 0 |
|  |  | Mooney viscosity: 63 [ML$_{1+4}$, 100° C.] [parts by mass] | 0 | 0 | 0 | 0 |
|  |  | Mooney viscosity: 120 [ML$_{1+4}$, 100° C.] [parts by mass] | 0 | 0 | 0 | 80 |
|  | particulate carbon material | expanded graphite (volume-average particle diameter: 250 µm) [parts by mass] | 70 | 50 | 100 | 120 |
|  | fibrous carbon material | readily dispersible aggregate of fibrous carbon nanostructures (specific surface area: 600 m²/g) [parts by mass] | 0.5 | 0.5 | 0.5 | 0.5 |
|  | plasticizer | phosphate ester [parts by mass] | 0 | 0 | 0 | 20 |
|  | percentage content of particulate carbon material in thermally conductive sheet [volume %] | | 36 | 28 | 44 | 46 |
|  | thickness [µm] | | 150 | 150 | 150 | 500 |
| Evaluation items | pump-out resistance | | A | C | A | C |
|  | thermal resistance under a pressure of 0.05 MPa [W/° C.] | | 0.193 | 0.142 | 0.320 | 0.420 |
|  | flame retardancy | | non-standard | V-0 | non-standard | V-0 |

The thermally conductive sheets of Examples 1 to 7 included a resin that is liquid under normal temperature and pressure, a resin that is solid under normal temperature and pressure, and particulate carbon material and had a thermal resistance under a pressure of 0.05 MPa of at most 0.30° C/W. As can be seen in Table 1, these Examples made good pump-out resistance compatible with high thermal conductivity at a relatively low clamping pressure.

By contrast, the thermally conductive sheet of Comparative Example 1 in which the only resin was a resin that is liquid under normal temperature and pressure had excellent thermal conductivity but significantly inferior pump-out resistance. The thermally conductive sheet of Comparative Example 3 in which the only resin was a resin that is solid under normal temperature and pressure had both significantly inferior thermal conductivity and pump-out resistance at a relatively low clamping pressure. Comparative Example 2, which had a thermal resistance exceeding a predetermined value under a pressure of 0.05 MPa, had inferior thermal conductivity at a relatively low clamping pressure.

INDUSTRIAL APPLICABILITY

The present disclosure can provide a thermally conductive sheet as a heat dissipating member that can achieve excellent thermal conductivity while suppressing pump-out during use at a relatively low clamping pressure.

The invention claimed is:

1. A thermally conductive sheet comprising:
   a thermoplastic fluororesin that is liquid under normal temperature and pressure;
   a thermoplastic fluororesin that is solid under normal temperature and pressure; and
   particulate carbon material,
   wherein a thermal resistance of the thermally conductive sheet under a pressure of 0.05 MPa is not less than 0.148° C/W and at most 0.30° C/W;
   the particulate carbon material is expanded graphite, and
   a percentage content of the particulate carbon material is at least 25 volume % and no greater than 40 volume %.

2. The thermally conductive sheet of claim 1, wherein a percentage content of the thermoplastic fluororesin that is liquid under normal temperature and pressure is at least 40 mass % and no greater than 90 mass % of a total content of the resin that is liquid under normal temperature and pressure and the thermoplastic fluororesin that is solid under normal temperature and pressure.

3. The thermally conductive sheet of claim 1, wherein a Mooney viscosity, ML$_{1+4}$, 100° C., of the thermoplastic fluororesin that is solid under normal temperature and pressure is at least 3.5 and no greater than 120.

4. The thermally conductive sheet of claim 1, wherein the particulate carbon material has a volume-average particle diameter of at least 1 μm.

5. The thermally conductive sheet of claim 1, wherein the thermoplastic fluororesin that is liquid under normal temperature and pressure has a viscosity at a temperature of 80° C. of at least 500 mPa·s and no greater than 30,000 mPa·s.

6. The thermally conductive sheet of claim 1, wherein a percentage content of the resin that is liquid under normal temperature and pressure is at least 40 mass % and no greater than 90 mass %.

7. The thermally conductive sheet of claim 4, wherein the particulate carbon material has a volume-average particle diameter of no greater than 500 μm.

8. The thermally conductive sheet of claim 6, wherein a percentage content of the particulate carbon material in the thermally conductive sheet is no greater than 35 volume %.

9. The thermally conductive sheet of claim 1, wherein the thermally conductive sheet has an Asker C hardness at 25° C. of at least 60 and no greater than 80.

10. The thermally conductive sheet of claim 1, wherein the aspect ratio of the particulate carbon material is at least 1 and no greater than 10.

* * * * *